(12) United States Patent
Kollmar et al.

(10) Patent No.: US 6,350,377 B1
(45) Date of Patent: Feb. 26, 2002

(54) DEVICE FOR THICKENING LIQUIDS OR SLUDGES

(75) Inventors: Ulrich Kollmar; Georg Mitschele, both of Pforzheim; Josef Klabuschnig, Neuhausen; Klaus Kuhn, Wurmberg; Lutz Unger, Neulingen, all of (DE)

(73) Assignee: Gebr Bellmer GmbH & Co. KG. Maschinen-Fabrik, Niefern-Oschelbronn (DE)

( * ) Notice: Subject to any disclaimer, the term of this patent is extended or adjusted under 35 U.S.C. 154(b) by 0 days.

(21) Appl. No.: 09/554,200
(22) PCT Filed: Nov. 10, 1998
(86) PCT No.: PCT/DE98/03269
   § 371 Date: Jul. 7, 2000
   § 102(e) Date: Jul. 7, 2000
(87) PCT Pub. No.: WO99/24371
   PCT Pub. Date: May 20, 1999

(30) Foreign Application Priority Data

Nov. 11, 1997 (DE) .......................... 197 49 757

(51) Int. Cl.$^7$ .............................. C02F 11/14; C02F 1/52
(52) U.S. Cl. .................... 210/198.1; 210/205; 210/216; 210/258; 210/387; 210/400; 210/609
(58) Field of Search .............................. 210/198.1, 205, 210/209, 216, 258, 359, 384, 387, 391, 393, 400, 416.1, 609, 729, 732; 100/118–120

(56) References Cited

U.S. PATENT DOCUMENTS

| | | | |
|---|---|---|---|
| 2,044,214 A | | 6/1936 | Jones |
| 2,529,882 A | | 11/1950 | Mittman |
| 3,617,539 A | * | 11/1971 | Grutsch |
| 3,896,030 A | * | 7/1975 | Bahr |
| 4,081,375 A | * | 3/1978 | Deal et al. |
| 4,116,843 A | * | 9/1978 | Koenig |
| 4,402,834 A | * | 9/1983 | Bastgen et al. |

OTHER PUBLICATIONS

Patent Abstracts of Japan, "Apparatus for Dehydrating Sludge," Pieere Furosaaruto, inventor, Pub. No. 62001422, Jan. 1987.

Patent Abstracts of Japan, "Belt Press," Iwatani Akitoshi, inventor, Pub. No. 60137600, Jul. 1985.

* cited by examiner

Primary Examiner—David A. Simmons
Assistant Examiner—Fred Prince
(74) Attorney, Agent, or Firm—Browdy and Neimark

(57) ABSTRACT

An apparatus for thickening liquids or thin sludges by water extraction, having a bottom, a tub having an underside, stands supporting the tub on the bottom, a ripening time chamber for receiving the liquids or thin sludges, first devices for admixing a polyelectrolyte for flocculation in the ripening time chamber, a conveyor belt for further dewatering the liquids or thin sludges, and second devices for delivering liquid extracted from the conveyor belt and thick sludge discharges. At least the conveyor belt, the ripening time chamber and the second devices are accommodated in the tub, which thus acts as a frame and a lateral boundary for the conveyor belt, the ripening time chamber and the second devices. All connections required for operation are disposed on the underside of the tub, and the underside of the tub is spaced above the bottom by the stands.

8 Claims, 2 Drawing Sheets

CONNECTION FOR SCREEN CLEANING

THIN SLUDGE INLET

DEVICE FOR THICKENING LIQUIDS OR SLUDGES

Figure 1:
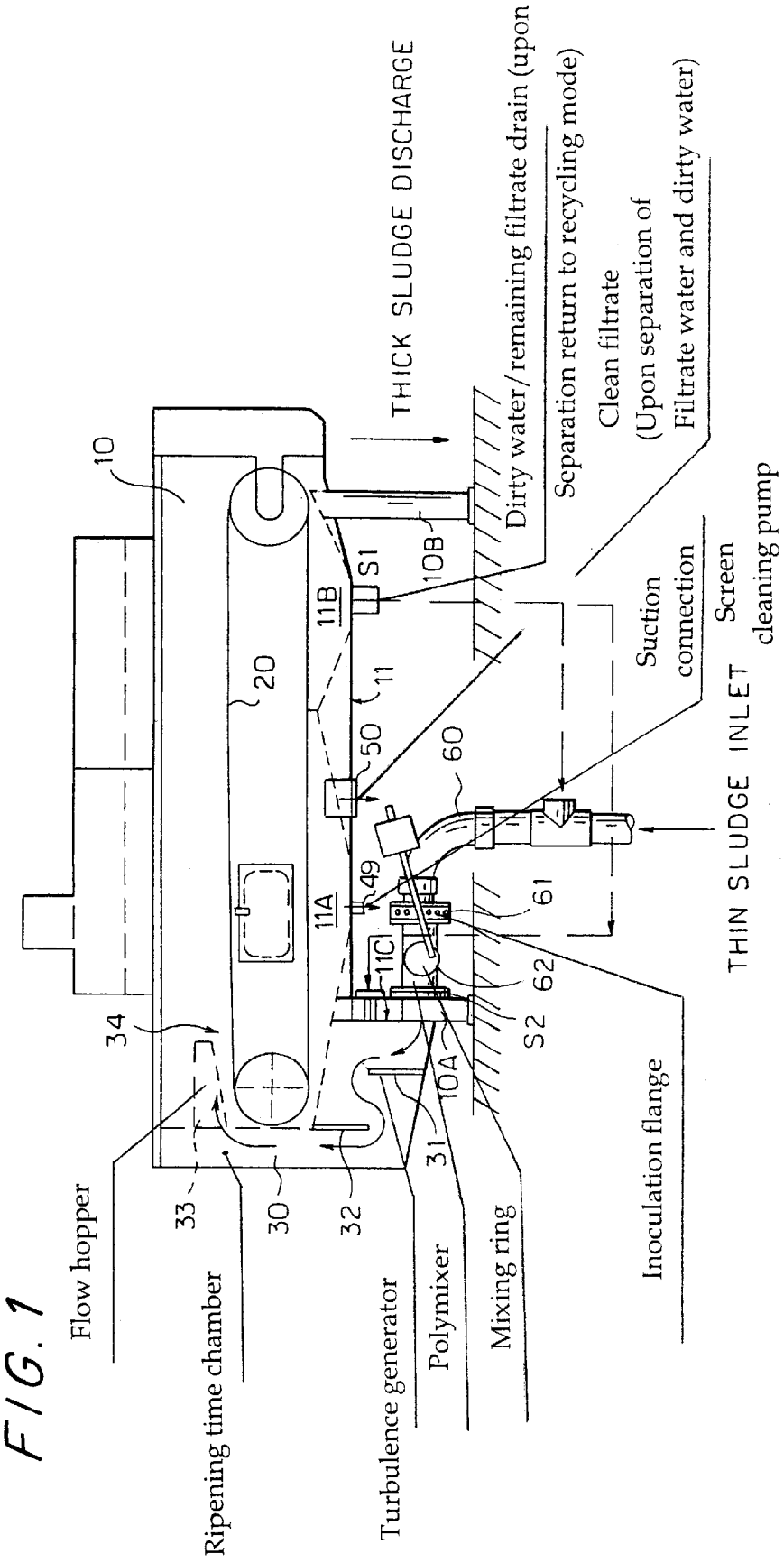

This application also is the national phase of international application PCT/DE98/03269 filed Nov. 10, 1998 which designated the U.S.

The invention relates to an apparatus as generically defined by the preamble to claim 1.

A preferred range of application of such apparatuses is the thickening of thin sludges, that is, the extraction of liquid from such thin sludges, so that a thick sludge discharge can then be provided at the outlet of the apparatus, with the dirty water and filtrate that occurs at the outlet of the process being carried away. Because of the conveyor belt, such an apparatus is as a rule called a "belt thickener".

Until now it has been usual to have the individual method steps (addition of the polyelectrolyte for the flocculation, passage through a ripening path for the action of the polyelectrolyte, deposit onto the belt thickener, etc.) performed in separate structural units, which have to be coupled to one another more or less inconveniently via pipelines and connecting parts, in order to assure a satisfactory sequence of these method steps.

These conventional embodiments also take up a great deal of space and are consequently inconvenient to realize for the final consumer; changes in the method sequence (for example if changes in the ripening times for different sludge consistencies are needed) can be made only with corresponding effort, and the same is naturally also true for inspections, maintenance and repairs.

It is therefore the object of the invention to make such an apparatus structurally simpler, easier to maintain and service, and more economical in terms of space.

According to the invention, this object is attained in accordance with the body of claim 1.

The fundamental concept of the invention is thus considered to be the common tub, which both statically-mechanically and functionally integrates the individual structural units and combines them in its method sequence.

The fundamental tub construction for all the essential functional components, and in particular the ripening time chamber and conveyor belt, also makes it possible to provide all the connections directly on the tub, for instance by means of suitable stubs or flanges, in particular in the lower region of the tub or directly on the underside of the tub, where these connections can be securely accommodated without requiring additional space and in a way protected from external influences.

The tub concept in particular makes it possible to solve problems in the region of the ripening time chamber in a novel way, either by inserting the entire ripening time chamber into the tub and fixing it there as a modular structural unit in a simple way, or by embodying the ripening time chamber of simple components, such as guide or deflector baffles which are then mounted and retained in their associated portion of the tub in a simple way, for instance in various positions, and can then optionally also be replaced again easily. Extreme ease of maintenance and repair is achieved by this concept, and in particular it is also possible to achieve the functional sequence of the method in a simple way by adapting the path length of the ripening time chamber by reorientation and/or replacement of suitable guide and deflector baffles, and thus to enable the apparatus of the invention to be converted for various kinds of mixtures of polyelectrolyte and sludge with different optimal ripening times.

Further advantageous features can be learned from further dependent claims.

Figure 2:
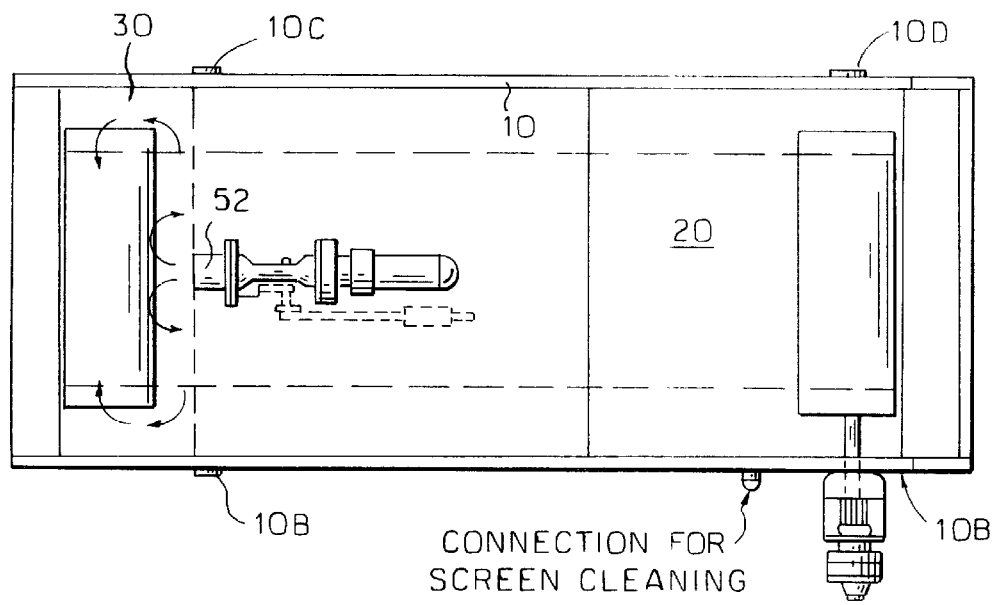
Figure 3:
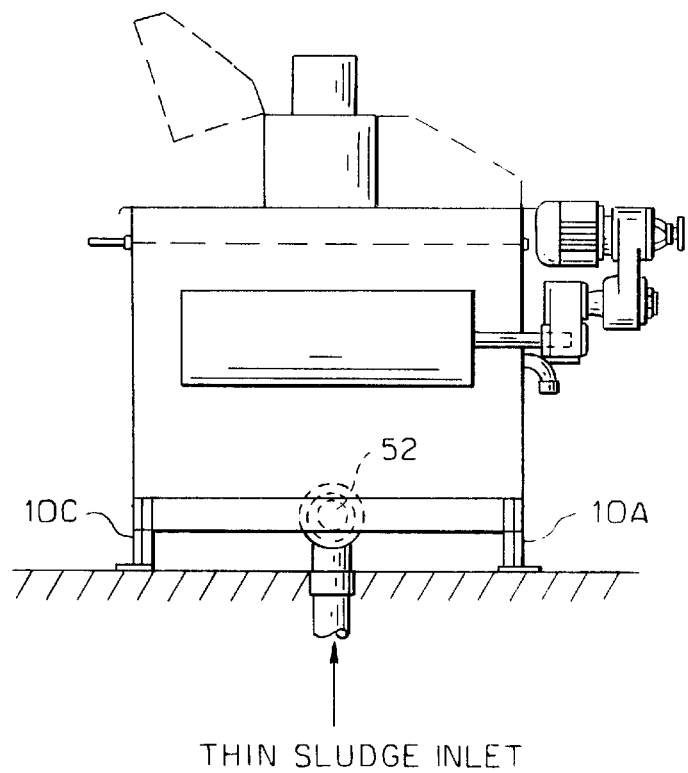

A preferred exemplary embodiment of the apparatus of the invention will now be described in further detail in conjunction with the drawings, which show:

FIG. 1: a side view/sectional view of the apparatus;
FIG. 2: a view of the apparatus from below; and
FIG. 3: a view of the apparatus from the front showing the face end or ripening time chamber of the apparatus on the left in terms of FIG. 1.

The apparatus shown in the drawings substantially comprises a tub 10, in which a conveyor belt 20 is held, which is preceded functionally and spatially by a ripening time chamber 30. Both the conveyor belt, or the two rollers, and the devices of the ripening time chamber that will be described in further detail hereinafter are secured to the inside of this tub 10; a screw- or plug-in type fastener is preferably provided, which enables easy replacement or access for repair and/or maintenance purposes and also easy conversion.

The tub is supported on the bottom via stands 10A . . . 10D. The underside 11 of the tub has a vertical portion 11C, which extends to shortly above the bottom, so that a protected lower region is created here below the tub 10 that according to the invention is preferably employed as a connection region for delivering and carrying away the functionally typical liquids or liquid mixtures:

Via a pipeline 60, the thin sludge to be thickened is delivered to the lowest region of the lowered portion of the tub 10, which forms the ripening time chamber 30. Via an inoculation flange 61 with a mixing ring 62, a specific quantity of a flocculation agent, as a rule a polyelectrolyte, is admixed in a regulatable amount with the thin sludge, and this mixture is then delivered on the inlet side to the ripening time chamber, via a connection flange 52.

The ripening time chamber itself extends substantially over the full width of the tub 10, and in the exemplary embodiment, it is subdivided with guide and deflector baffles 31, 32, 33 in such a way that the optimal length of the ripening path for the particular thin sludge and the particular flocculation agent employed and thus the optimal length of the ripening time are obtained; the flow conditions are varied as well (turbulence generator, flow hopper). These components can either be prefabricated in the form of a module (the length of the ripening path can be predetermined differently by replacing modules), or the individual guide and deflector baffles can be fixed separately in various positions in the tub 10.

The ripening time chamber 30 ends in the feed region of the conveyor belt 20, where an outlet lip 34 is formed. After that, the further dewatering takes place over the length of the path of the conveyor belt; the liquids that occur are drawn off at suitable connections 49, 50, 51 for screen cleaning, dirty water, or remaining filtrate. The connections 49 and 51 are provided at the apex of funnel-like portions 11A, 11B of the tub 10. Once the liquid extraction has been performed, the thick sludge formed is then discharged at the end of the apparatus, for instance onto a conveyor belt or into movable containers.

The tub design also makes it possible in particular to recycle the screen wash water back into the tub and to increase the degree of filtration; as a result, operation of the system without external added water is possible even when throughputs are low.

What is claimed is:

1. An apparatus for thickening liquids or thin sludges by water extraction, having a bottom, a tub having an underside, stands supporting the tub on the bottom, a ripening time chamber for receiving the liquids or thin sludges, first devices for admixing a polyelectrolyte for flocculation in the ripening time chamber, a conveyor belt for further dewatering the liquids or thin sludges, and second devices for delivering liquid extracted from the conveyor belt and thick sludge discharges, wherein at least the conveyor belt, the ripening time chamber and the second devices are accommodated in the tub, which thus acts as a frame and a lateral boundary for the conveyor belt, the ripening time chamber and the second devices, and further wherein all connections required for operation are disposed on the underside of the tub, and the underside of the tub is spaced above the bottom by the stands.

2. The apparatus of claim 1, wherein the conveyor belt and the first devices are each held as a respective modular component unit on the inside of the tub.

3. The apparatus of claim 1, wherein the underside of the tub is divided into at least two funnel-shaped regions, at the apex of which connection stubs are provided.

4. The apparatus of claim 1, wherein the ripening time chamber has a lower-lying portion with a vertical wall on which a connection for the thin sludge provided with polyelectrolyte is located.

5. The apparatus of claim 1, further comprising third devices for varying flocculation time in the ripening time chamber are provided in the ripening time chamber and make a variable path length for the thin sludge and thus an adjustable ripening time possible.

6. The apparatus of claim 5, wherein the third devices are formed by guide and deflector baffles which predetermine a flow conduit in the ripening time chamber and which define flow conditions from one portion to another.

7. The apparatus of claim 5, wherein the conveyor belt and the third devices are held separably, and in particular in plug-in or screw-in fashion, on the inside of the tub.

8. The apparatus of claim 1 wherein said conveyor belt has an upper reach disposed to receive the liquids or thin sludges from the ripening time chamber.

* * * * *